United States Patent [19]
Andrew

[11] 4,086,479
[45] Apr. 25, 1978

[54] REMOVABLE LAMP DEVICE

[76] Inventor: John W. Andrew, 695 SW. Rustic Cir., Stuart, Fla. 33494

[21] Appl. No.: 738,093

[22] Filed: Nov. 2, 1976

[51] Int. Cl.$^2$ .................. B60Q 1/30; F21V 21/08; H01R 13/54
[52] U.S. Cl. .................. 362/432; 339/91 F; 362/249
[58] Field of Search .................. 240/7.1 R, 7.1 F, 8.3, 240/52.1, 57, 73 QD; 339/91 F, 119 R, 119 L

[56] References Cited
U.S. PATENT DOCUMENTS

| | | | |
|---|---|---|---|
| 1,727,368 | 9/1929 | Eustice | 339/91 F |
| 2,238,728 | 4/1941 | Hadley et al. | 240/8.3 |
| 2,785,292 | 3/1957 | Walleroth | 240/8.3 X |
| 2,806,940 | 9/1957 | Worden | 240/52.1 |

Primary Examiner—L. T. Hix
Assistant Examiner—M. L. Gellner
Attorney, Agent, or Firm—Robert D. Farkas

[57] ABSTRACT

A removable lamp device for use on a vehicle such as a boat trailer. The device includes a base mountable on the vehicle and having a first planar surface having three first substantially planar resilient slide contacts thereon each connected to one conductor from the vehicle lamp circuit. A lamp holder has a lamp mounting assembly thereon and a second planar surface on which three second substantially planar resilient slides contacts are mounted for sliding engagement with the first slide contacts and which are connected to the lamp wires from the lamp assembly. The base and the holder are releasably connected to each other upon engagement of the first and second sliding contacts.

5 Claims, 4 Drawing Figures

REMOVABLE LAMP DEVICE

BACKGROUND OF THE INVENTION

The present invention relates to a removable lamp device for use on a vehicle.

Removable lamp devices are known in the prior art for use on vehicles such as boat trailers so that a lamp can be removed before getting wet when the boat is being put into the water. These devices have the disadvantage of not providing a simple construction for effecting both the engagement of the contacts and the mounting and dismounting of lamp holder to the vehicle.

Among the known prior art devices that have this above disadvantage are those disclosed in U.S. Pat. Nos. 2,785,292; 3,046,388; 3,089,951; 3,106,349; 3,788,502; 3,863,999; 3,885,146; and 3,900,725.

SUMMARY OF THE INVENTION

It is the principle object of this invention to provide a removable lamp device that overcomes the disadvantages of the prior art.

These and other objects are achieved by the preferred embodiment in which a plurality of resilient and rectangular slide contacts are mounted to surfaces of a pair of block defining a base and lamp holder. Each contact on the base is connected at one end to its proper circuit wire and is parallel to and aligned with an adjacent contact. The contacts are parallel and spaced apart from the base surface with access between the contact and the block from the top. Each contact of the lamp holder is associated with one contact of the base and is similarly mounted with access from the bottom.

When sliding the blocks together, the contacts are slid into engagement to complete the electrical circuitry.

Clamping members are affixed to each block to retain the proper engagement.

Having in mind the above and other objects that will be obvious from an understanding of the disclosure, the present invention comprises a combination and arrangement of parts illustrated in the presently preferred emoboiments of the invention which are hereinafter set forth in sufficient detail to enable those persons skilled in the art to clearly understand the function, operation, construction and advantages of it when read in conjunction with the accompanying drawing.

BRIEF DESCRIPTION OF THE DRAWING

The invention will be described in detail, by way of example, with reference to the accompanying drawing, in which.

DETAILED DESCRIPTION OF THE INVENTION

Figure 1:
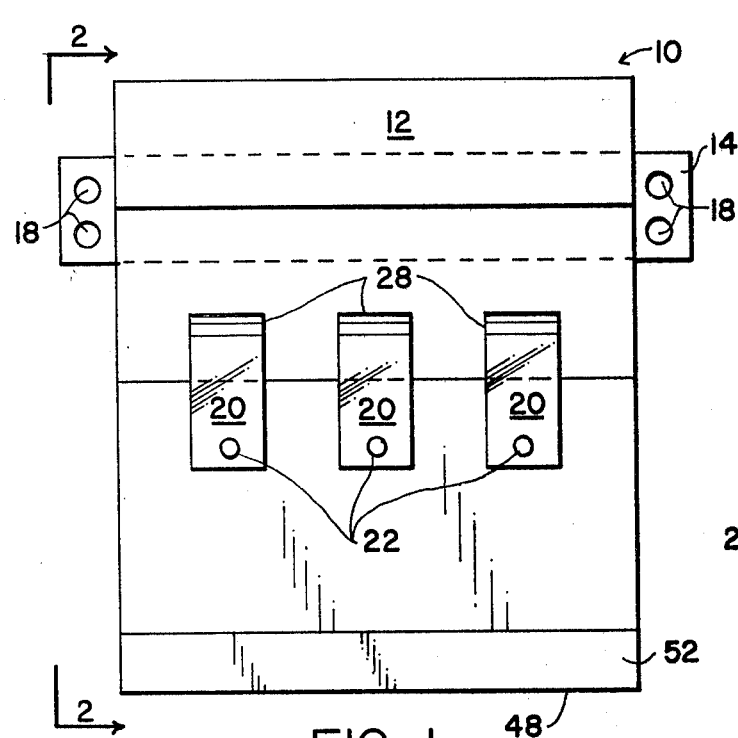
FIG. 1 is a front elevational view of the base.
Figure 2:
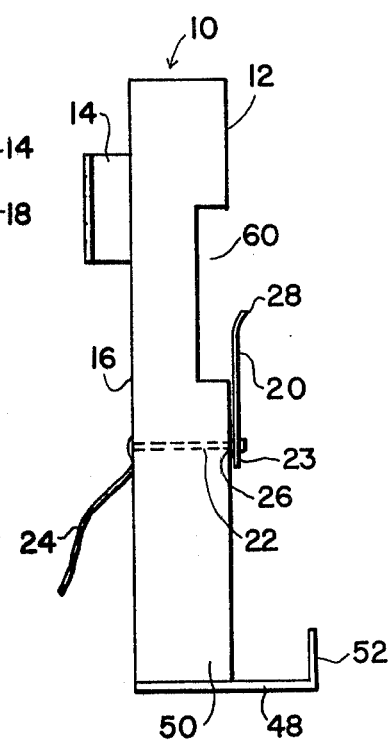
FIG. 2 is a side elevational view of the base.
Figure 4:
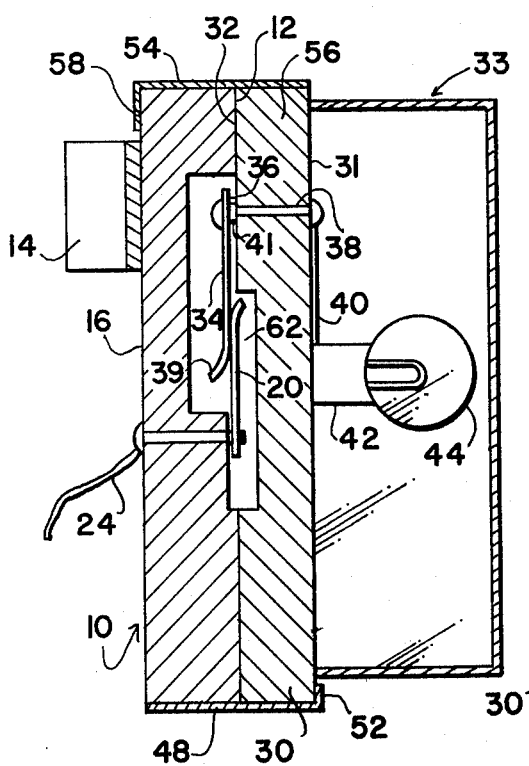
FIG. 4 is a sectional view taken along line 4—4 in FIG. 3 showing the preferred embodiment.
Figure 3:
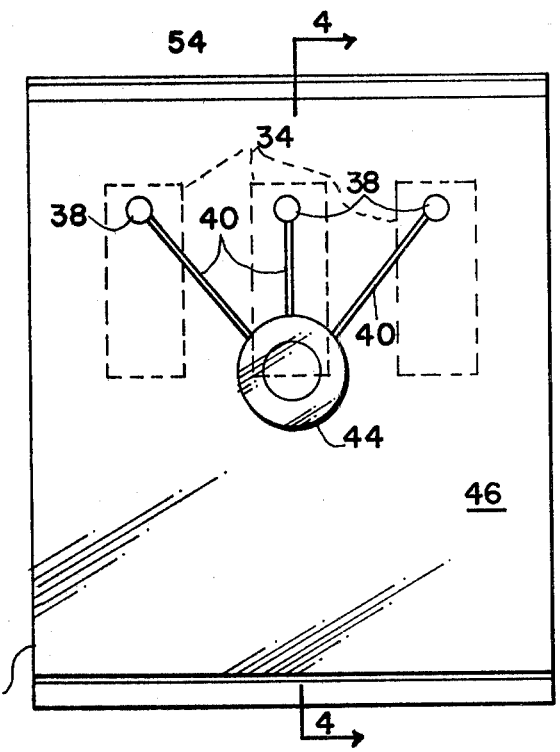
FIG. 3 is a front elevational view of the lamp holder and base.

Referring in detail to FIGS. 1-4 of the drawing and in accordance with the principles of the invention, a removable lamp device for use on a vehicle having a lamp circuit such as a boat trailer or the like is shown. The device comprises a base 10 having a substantially rectangular cross section and a first planar surface 12. The base 10 is mountable to a vehicle by means of a bracket 14 affixed to a second surface 16 opposie the first planar surface. Mounting holes 18 in the bracket 14 receive mounting screws, now shown, for attachment to the vehicle.

A plurality of first resilient slide contacts 20, each substantially planar and rectangular are each identically mounted parallel to and spaced apart from, the first planar surface 12. Each contact 20 is connected to the base 10 by a post 22 affixed at one end to one end 23 of the contact 20 and passing through the base 10 and connected to one or more vehicle lamp circuit cinductors 24. A spacing member 26 maintains each contact 20 apart from the planar surface 12.

A lamp holder 30 having a first surface 31 for mounting a plurality of lamp assemblies 33 and a planar surface 32 has a plurality of second resilient slide contacts 34, each substantially planar and rectangularly connected thereto. These contacts 34 are affixed at one end 36 to posts 38 with spacing member 41 to maintain the contact 34 parallel and spaced apart from passing through the holder and for connecting the lamp wires 40. The lamp contacts 34 are arced outwardly from the surface 32 and the other end 39.

A lamp holder 30 having a rectangular cross section and a first surface 31 and a second planar surface 32 further includes a plurality of second resilient slide contacts 34, each substantially planar and rectangularly mounted parallel and spaced apart therefrom. These contacts 34 are each affixed at one end 36 to a post 38 including spacing member 41, the post 38 passing through the holder 30 and conntected to the lamp wires 40. The lamp contacts 34 are also arced outwardly from the second planar surface 32 at their other end 39. The lamp assembly 33 includes a plurality of lamp sockets 42 and lamps 44 each associated with one contact 34 and a protective cover 46.

Means for releasably connecting the base 10 to the lamp holder 30 upon the engagement of the first slide contact 20 with an associated second slide contact 34. These means include a first L-shaped member 48 connected to the bottom portion 50 of the base 10 with the leg 52 of the L-shaped member 54 connected to the top portion 56 of the lamp holder 30 with the leg 58 of the L-shaped member 54 extending downwardly. The device is clamped together by having the leg 52, 58 of each L-shaped member engaging with the surfaces 31, 16 opposite the planar surfaces 32, 12 and holding the planar surfaces 32, 12 aligned and in contact. In this position, the first contacts 20 have slid into contact with an associated second contact 34 to complete a circuit from the circuit conductors 24 to the lamps 44. To facilitate this engagement, a first indented surface 60 is provided in the base 10 aligned with the contacts 20 and a second indented surface 62 is similarly provided in the lamp holder 30.

While preferred and other exemplary embodiments of the invention are illustrated and/or described, it will be understood that the invention is in no way limited to these embodiments.

What is claimed is:

1. A removable lamp device for use on a vehicle having a lamp circuit such as a boat trailer or the like, said device comprising:

a. a base having a first planar surface and including means for mounting the base to the vehicle with the first planar surface facing outwardly therefrom, a plurality of first substantially planar resilient slide contacts each connectable to one conductor from the vehicle lamp circuit and means connecting the contacts to said base to position the first contacts in a plane parallel to and spaced from said first planar surface;

b. a lamp holder having a second planar surface and comprising a plurality of second substantially planar resilient slide contacts, means connecting the second contacts to said second surface to dispose same in a plane parallel thereto and spaced therefrom wherein the second slide contacts are slidably engagable with said first slide contacts and a lamp assembly connected to said holder opposite said first surface and having lamp wires each connected to one second contact;

c. means disposed on said base and said holder for releasably connecting the two upon engagement of the first and second slide contacts; and d. wherein the slide contacts are rectangular and the means connecting each contact to its respective surface includes a post having one end through one end of the contact and a spacing member between the contact and its associated surface, wherein the vehicle lamp circuit conductors and the lamp wires are each connected to the other end pf the posts, the other end of each contact being arced outwardly from its associated surface, and wherein the base and the holder have substantially rectangular cross sections and wherein the means releasably connecting same comprise a first L-shaped member connected along a portion of the base corresponding to the bottom thereof when mounted with the leg of the L-shaped member extending upwardly, and a second L-shaped member connected along a portion of the holder corresponding to the top thereof with the leg of the second L-shaped member extending downwardly.

2. A device according to claim 1, wherein the holder further comprises an indented portion in said second surface aligned with the second contacts to facilitate engagement with said first contact.

3. A device according to claim 2, wherein the base further comprises an indented portion in said first surface aligned with the first contacts to facilitate engagement with said second contacts.

4. A device according to claim 3, wherein said lamp assembly includes a lamp socket, a lamp received therein and a protective cover thereover.

5. A device according to claim 4, wherein the means for mounting the base to the vehicle comprises a bracket connected to the base and affixable to the vehicle.

* * * * *